No. 867,674.  
PATENTED OCT. 8, 1907.
L. R. ROBERTS.  
TYPE WRITER.  
APPLICATION FILED JULY 14, 1906.
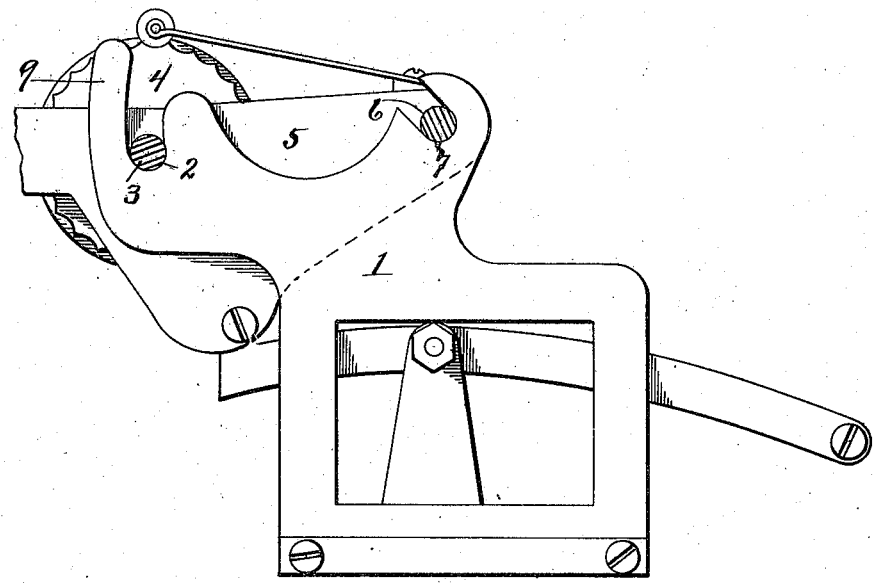
WITNESSES  
May E. Kott.  
Lotta Lee Hayton.
INVENTOR  
Lyman R. Robert  
Parker V Burton  
Attorneys.

UNITED STATES PATENT OFFICE.

LYMAN R. ROBERTS, OF DETROIT, MICHIGAN.

TYPE-WRITER.

No. 867,674.  Specification of Letters Patent.  Patented Oct. 8, 1907.

Application filed July 14, 1906. Serial No. 326,169.

*To all whom it may concern:*

Be it known that I, LYMAN R. ROBERTS, a citizen of the United States, residing at Detroit, county of Wayne, State of Michigan, have invented a certain new and useful Improvement in Type-Writers, and declare the following to be a full, clear, and exact description of the same, such as will enable others skilled in the art to which it pertains to make and use the same, reference being had to the accompanying drawings; which form a part of this specification.

This invention relates to typewriters; it has for its object an improved bearing for the platen or roll, against which the type strikes The object of the improvement is to produce a bearing such that the platen may be held securely in place while in use, but may be at once lifted off from its bearing and removed from the carriage when it is desired to so remove it.

The drawing shows the upper part of the carriage and the platen in elevation.

1, indicates an end frame of the shifting saddle upon the carriage of a typewriter; this has a bearing 2 in which rest the projecting end of the arbor 3 of the typewriter roll 4. The arbor 3 is held in bearings in a plate 5 which forms one end of the cage of the typewriter platen. A bar 6 parallel to the arbor 3 forms a tie rod of the cage. The arbor 3 rests in the bearings 2 and the rod 6 rests in a bearing 7; both bearings are in the end plate of the saddle part of the main carriage. Similar bearings are formed at the opposite end of the saddle for the further end of the arbor 3 and the rod 6.

The bearing 2 is at the bottom of a slot like opening which is curved around a center which is at the axis or center of the rod 6. The bearing 7 is at the bottom of an opening which is inclined to a horizontal line from 2 to 7, and may be considered as substantially along a radius of the curvature of the slot at the bottom of which is the bearing 2. It is not essential that the incline should be such that the opening is exactly on a radial line nor is it in fact shown so in the drawing. The essential requisite being that when both the arbor 3 and the rod 6 are at rest in their bearings, the two shall be secured against any movement except a turning or swinging movement of the arbor 3 about the rod 6 as a center.

To remove the platen from its rest in the saddle, it is first lifted to swing the platen and its arbor around the rod 6 as a center until the arbor clears the horn 9, after which the entire platen may be lifted, lifting the rod 6 away from its bearing.

What I claim is:—

1. In a typewriter, in combination with a platen provided with an arbor and a counter-shaft fixedly spaced thereby the one from the other, a typewriter carriage, a saddle thereon, provided with a bearing for said arbor having a curved groove opening into said bearing, from above, a bearing for said counter-shaft having a groove opening into said b ring and inclined to coincide approximately with a radius of the curvature of said first mentioned groove being located on the concaved side thereof, whereby the bearings for the two shafts rest normally on diverging surfaces, substantially as described.

2. In a typewriter, in combination with a platen frame provided with a platen arbor and a counter-shaft whose distance the one from the other is invariable, bearings for the said platen arbor and counter-shaft having slots leading thereinto from above, the slot for said arbor being curved around the normal center of the counter shaft when located in its bearing, the slot for said counter-shaft leading into said bearing on an incline from above downward, substantially as described.

In testimony whereof, I sign this specification in the presence of two witnesses.

LYMAN R. ROBERTS.

Witnesses:
 CHARLES F. BURTON,
 LOTTA LEE HAYTON.